July 22, 1930.  J. K. DARBY  1,771,326
LIQUID DISPENSING DEVICE
Filed March 28, 1927  5 Sheets-Sheet 1

Inventor
James K. Darby
By his Atty's Darby & Darby

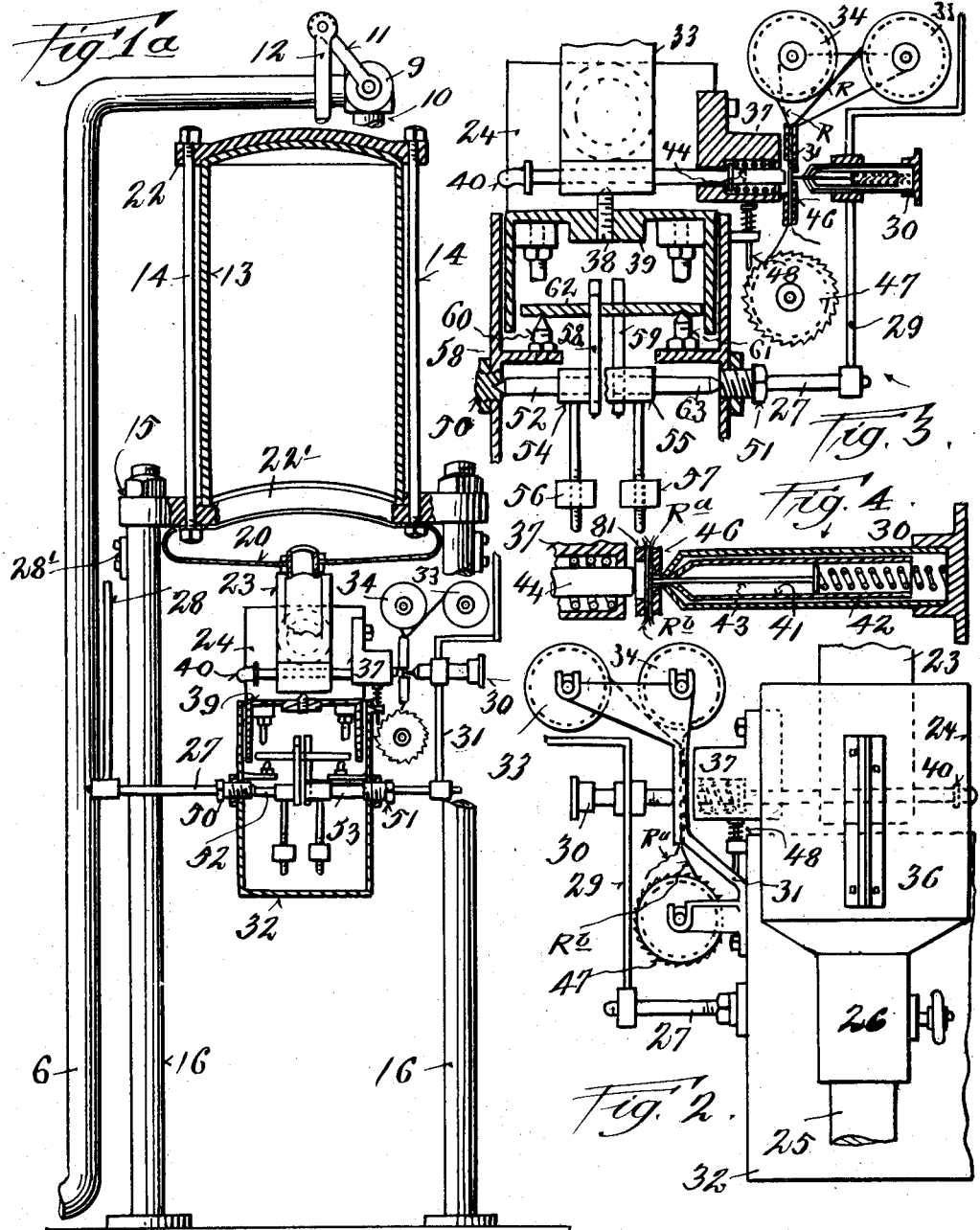

July 22, 1930.  J. K. DARBY  1,771,326
LIQUID DISPENSING DEVICE
Filed March 28, 1927   5 Sheets-Sheet 3
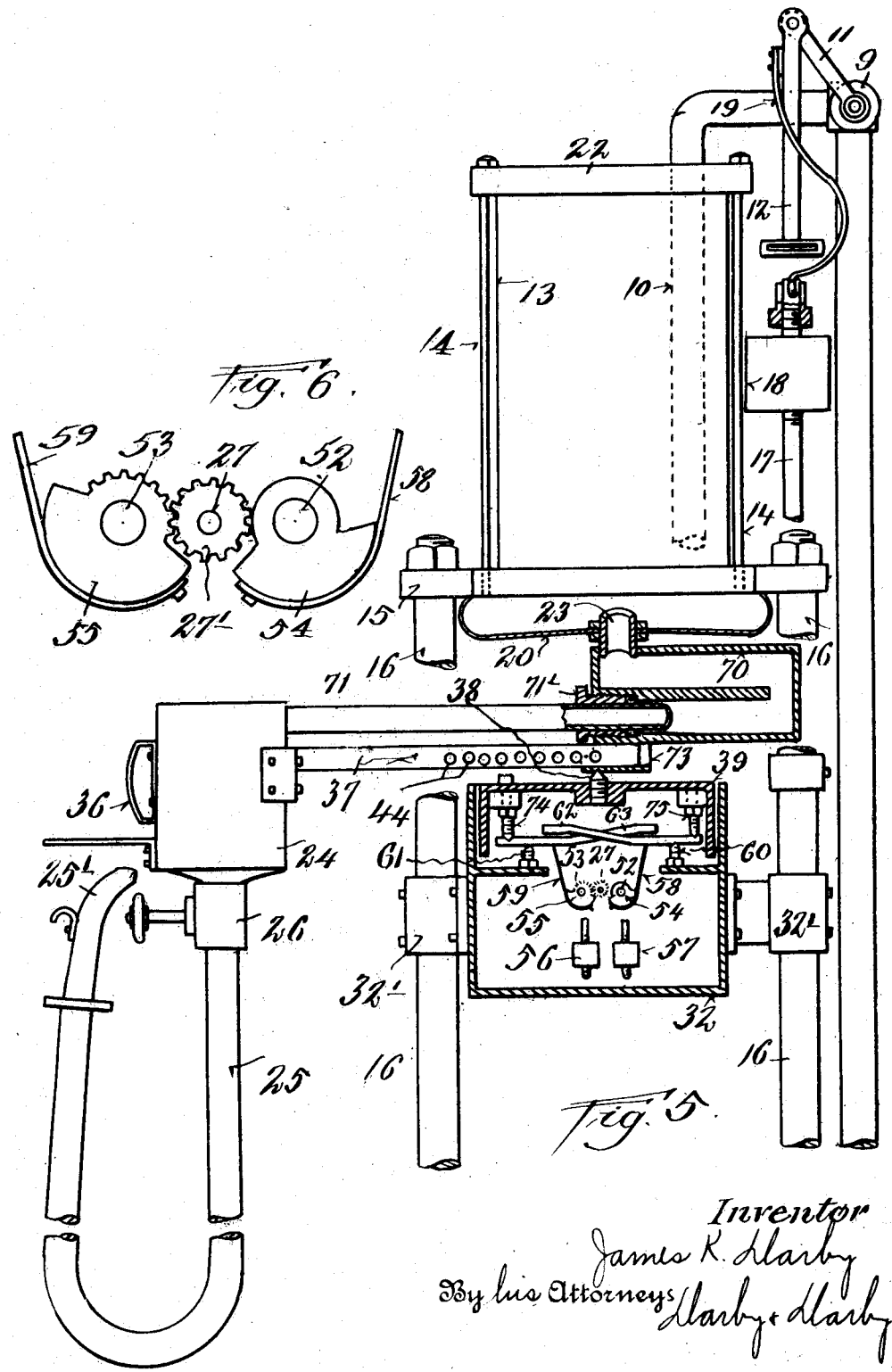
Inventor
James K. Darby
By his Attorneys
Darby & Darby

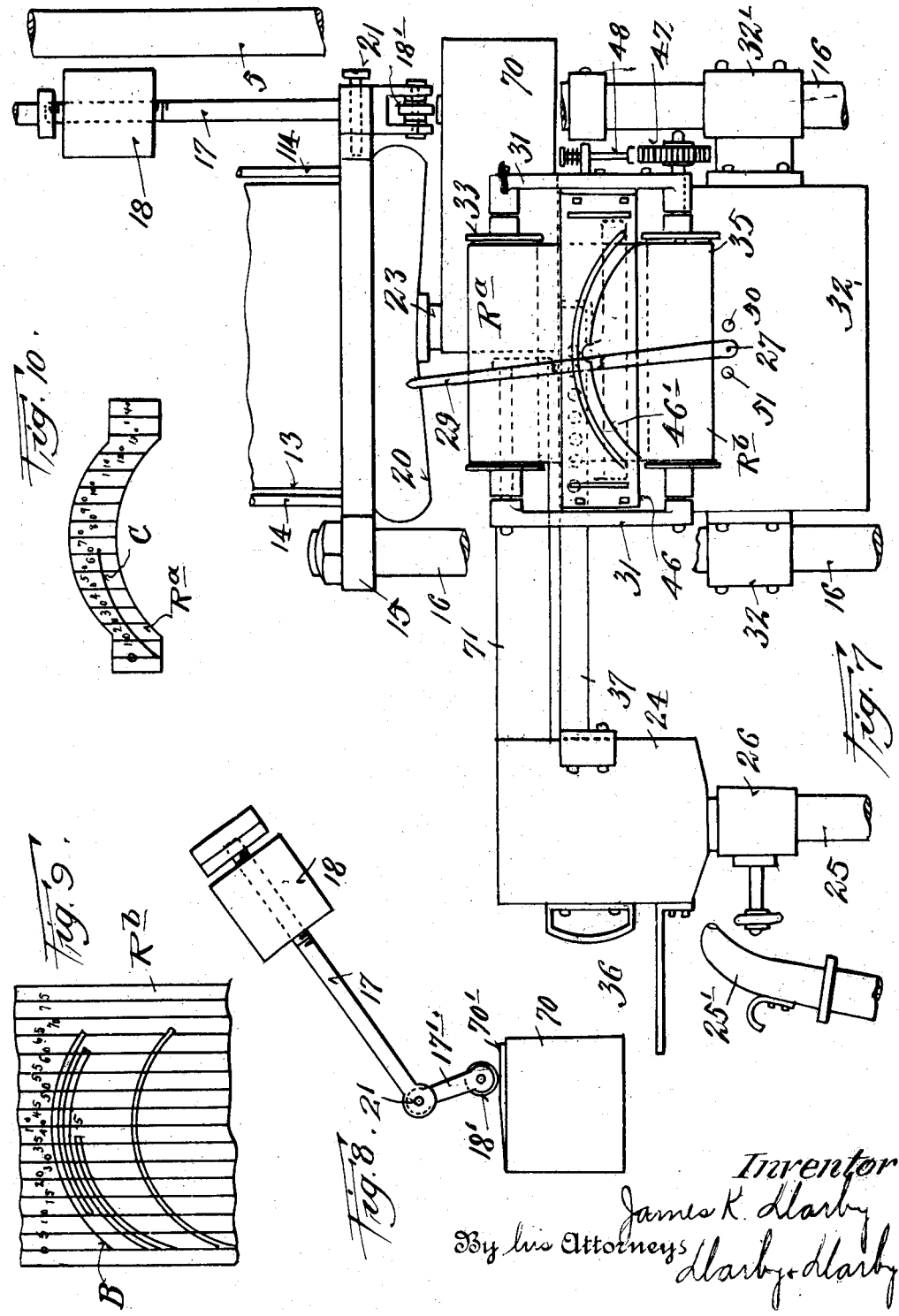

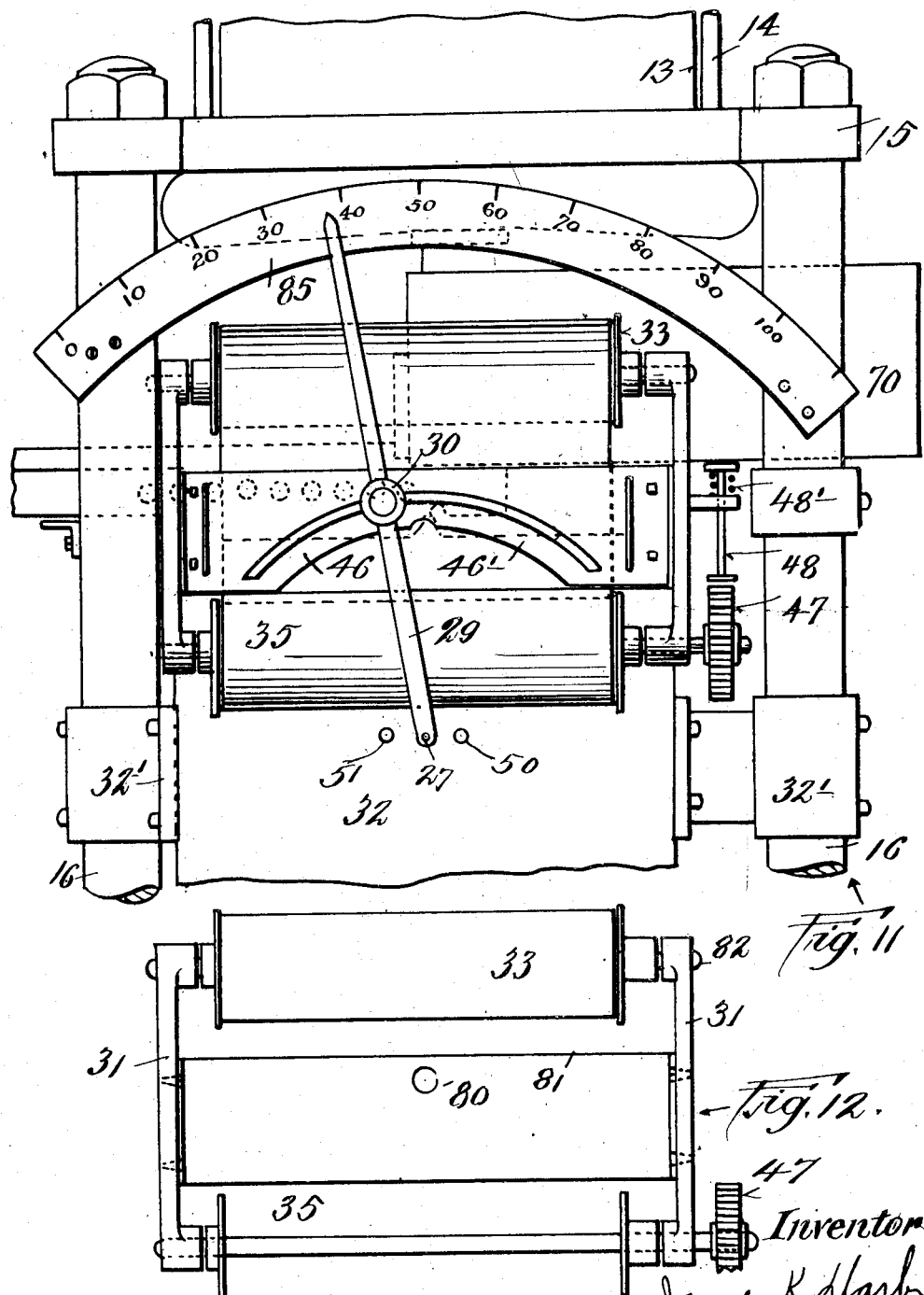

Patented July 22, 1930

1,771,326

UNITED STATES PATENT OFFICE

JAMES K. DARBY, OF DAYTON, OHIO, ASSIGNOR OF ONE-THIRD TO LAWRENCE C. STOLTZ, OF DAYTON, OHIO

LIQUID-DISPENSING DEVICE

Application filed March 28, 1927. Serial No. 178,846.

This invention relates in general to liquid dispensing devices.

One of the objects of this invention is the provision of a device for dispensing liquids by weight per unit volume.

A further object of this invention is the provision of a device for dispensing liquid by weight per unit volume and providing a continuous record of the liquid dispensed.

A still further object of this invention is the provision of recording means in a device as mentioned above which is adapted to make a permanent record of all the liquid dispensed and separate records of the individual dispensations.

A still further object of this invention is the combination with a supply source and means for delivering liquid therefrom of means for receiving the liquid and recording its weight as it passes therethrough.

A still further object of this invention is the provision of means and in a device as described above, which is adapted for automatically shutting off the supply of liquid to the receiving means when a predetermined quantity by weight has been delivered thereto.

A still further object of this invention is the provision of a receiving chamber for use in dispensing liquids which is mounted for movement about a pivot point and adjustable with respect thereto so as to provide that a predetermined quantity of the liquid may be delivered thereto.

Another object of this invention is to provide a device by means of which a standard United States gallon chamber is mounted with respect to a pivot point and means for receiving a larger body of liquid whereby a balance may be secured between the two bodies of liquid so as to operate means for closing off the supply when a predetermined quantity has been delivered from the source.

A further object of the invention is to provide means in combination with the preceding combination adapted to make a permanent record of the weight of all liquid delivered from a source as well as separate records of the individual quantities delivered therefrom.

These and many other results appear from the following disclosure and are provided by means of my invention.

This invention resides substantially in the combination, construction, arrangement and relative location of parts as will appear below.

Referring to the drawings in which the same reference numerals will be used in the different views to indicate the same or similar parts,—

Figure 1 is a side elevational view of the left hand half of a complete installation employing the principles of my invention;

Fig. 1ª is a corresponding view of the other half with the operating mechanism in vertical cross section with some parts broken away;

Fig. 2 is an enlarged side elevational view of a detail of the invention showing the supports for the record tapes;

Fig. 3 is an enlarged cross sectional view with some parts broken away of the means for operating the recording device;

Fig. 4 is a cross sectional view of the scribing device and the plunger stamp;

Fig. 5 is an enlarged side elevational view taken at right angles to Fig. 1 with some parts broken away and some parts in cross section showing the relation between the balancing chamber and the mechanism for operating the recording devices;

Fig. 6 is an enlarged detail side view of the driving means for the recording device;

Fig. 7 is a side elevational view of the device with the supports and the top of the tank broken away to show the indicating and recording devices;

Fig. 8 is an enlarged detail view of the cam operated weight for shutting off the supply from the liquid source.

Fig. 9 is a portion of the permanent record tape;

Fig. 10 is a view of a record for an individual dispensation;

Fig. 11 is an enlarged side elevational view showing more clearly the recording and indicating means; and Fig. 12 is an enlarged detail view of the supports for the record tape rolls.

Figure 1:
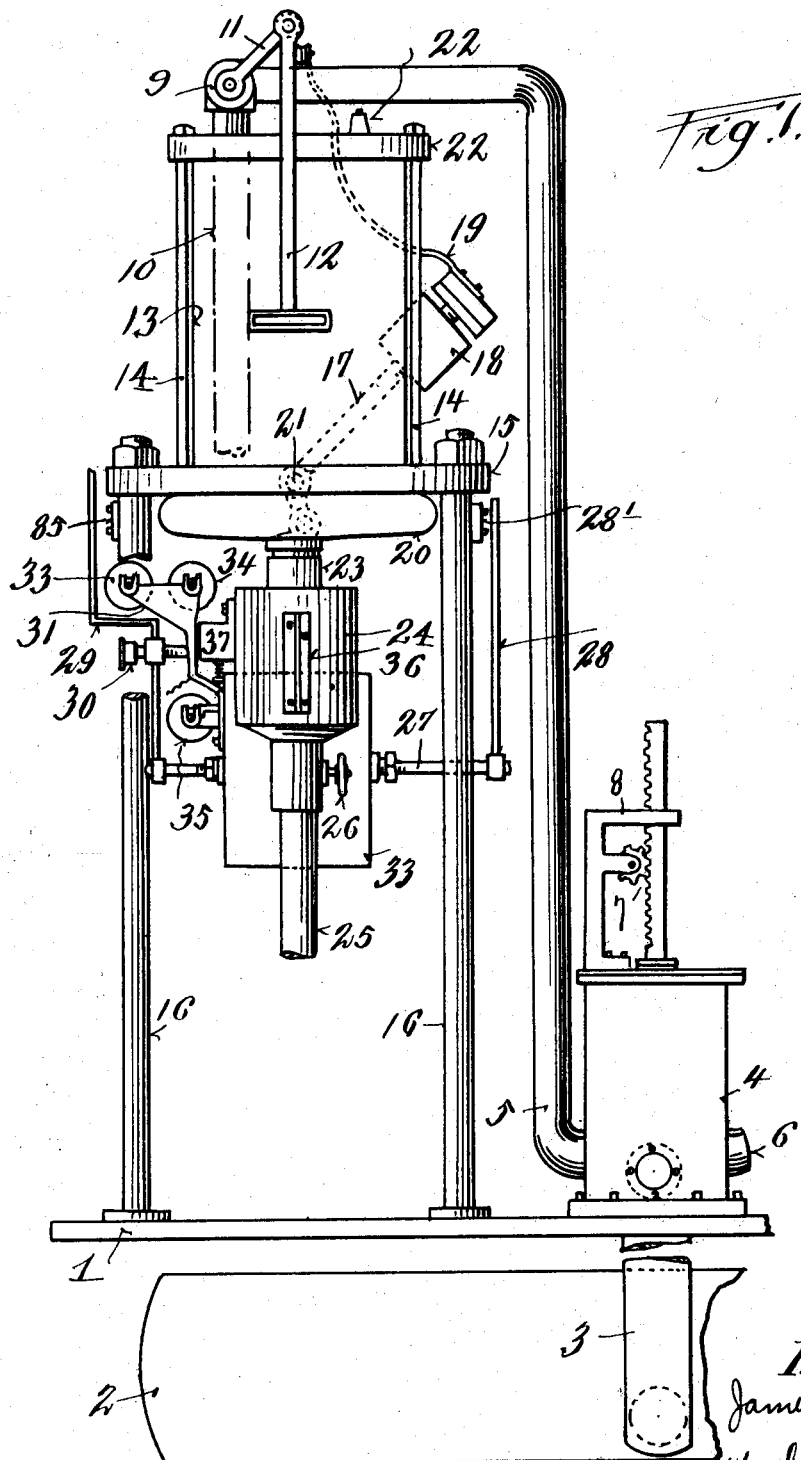

In the present method of dispensing liquids, such as for instance gasoline, it is well known that the product may vary under different conditions of temperature and pressure as well as its specific gravity. Thus, some gasolines are much lighter and more volatile than other gasolines so that although a given volume of liquid is purchased, the quality of the liquid is not uniform. One of the standard methods of specifying gasoline, is to denote its weight in pounds per gallon. Jobbers and the like who purchase large quantities of gasoline specify as one method of indicating the quality of the gasoline, pounds per standard gallon which the gasoline must weigh. The ordinary consumer however, at the present time who buys in small quantities has no way to check up the value of the gasoline which he is purchasing and may merely see that he gets a given volume of gasoline.

The invention about to be described, provides a relatively simple, automatic device for accurately and quickly dispensing a given volume of liquid and at the same time, producing a permanent record of the total weight of the volume dispensed. As will appear later, the device is so arranged that a standard gallon of gasoline is balanced against a given predetermined quantity of gasoline and in so doing, a recording mechanism is operated to provide a permanent continuous record of the weight of the quantity measured as well as a permanent individual record of the particular quantity dispensed.

Referring to the drawings a suitable support 1 such as a floor platform or concrete base, is provided below which is mounted for instance below the level of the ground, a suitable source of supply 2 for the liquid from which it is dispensed through an intake pipe 3 by means of any suitable type of pump 4. I have shown in connection with a single source and a single pump, two dispensing devices as will be shown by taking Figs. 1 and 1ª together.

It is of course evident that this is not a necessary combination since one or more than two devices may be supplied from a single pump. The operating mechanism for the pump is shown as comprising a driving gear 8 and a gear rack 7 connected to the piston pump. The particular construction of the pump is no part of this invention since any suitable or desirable pump may be employed in connection with the rest of the apparatus.

Delivery pipes 5 and 6 lead the gasoline from the pump to the dispensing apparatus. A suitable valve 9 is provided in the delivery lines. The delivery lines are connected to a short length of pipe 10 which projects into a suitable container 13. The valve 9 is provided with a lever 11 to which has been pivotally connected a manual operating bar and handle 12. The container 13 which may be made in any cross section and of any material as glass, metal and the like is clamped by means of the rods 14 between two end members 22 and 15. A large opening 22' is provided in the member 15 and a flexible bottom 20 is provided for the chamber 13. The seats in the members 22 and 15 and the flexible bottom 20 are all united together and to the chamber 13 so as to provide liquid tight connections. Mounted on the upper end plate 22 is a suitable air vent 22" for maintaining atmospheric pressure within the container 13. Pivotally mounted at 21 is a rod 17 which is threaded at its outer end and has mounted thereon a weight 18 for rotation on the threads. The end of the rod is connected by means of a flexible link 19 to the rod 12. As shown in Fig. 8 secured to the rod 17 for rotation therewith is a short arm 17' which is provided at its end with a roller or cam follower 18', adapted to contact with the cam surface 70' on the chamber 70. The operation of this equipment will be described later.

Secured in the bottom of the flexible member 20 near the center thereof, is a delivery connection 23 forming a liquid tight union therewith and delivering into the chamber. The whole structure is supported by means of the vertical uprights 16 secured to the bottom plate member 15. The chamber 70 is connected to a delivery pipe 71 which is mounted in a packing gland formed by means of the threaded thimble 71' mounted in the chamber 70. A chamber or container 24 is secured to the outer end of pipe 71 and is of such size as to be a United States standard gallon. This container delivers into a flexible hose 25 through a control valve 26 and has on its outer end a delivery nozzle 25'. Also secured to the container 24 is a bar or rod 37 adapted to slide in a bracket 73 secured to the base of the container 70. A plurality of plungers 44 are mounted within recesses in the rod or bar 37 and have on the ends raised numbers indicating the number of gallons that the device is adapted to measure out when that particular plunger is moved into alignment with an operating rod 40 as will be described later (see Fig. 3). A handle 36 is provided for moving the chamber 24 towards and away from the pivot point at 38. The packing gland 71' provides a light tight connection between the chamber 70 and the pipe 71 and serves in connection with the rod 37 for supporting the chamber 24.

The uprights 16 serve to support by means of the brackets 32' the container or casing 32 within which is mounted the mechanism for operating the recording devices. A movable member 39 is slidably mounted in the casing 32 and is supported at the outer ends of the levers 62 and 63 by means of the pivots 75 and 74 respectively. It will be noted that the pivot pin or member 38 is secured to the movable member 39. Journaled in the casing 32 and extending therethrough, is a shaft 27 having mounted on opposite ends, the pointers 28 and 29 respectively. A scriber member 30, which will be described in detail later, is mounted on the pointer 29. Supported on one side of the casing 32 is a bracket or frame work 31, in which is journaled the tape rolls 33, 34 and 35. An indicating scale is shown at 28' for the pointer 28 and a similar scale 85 is shown for the pointer 29.

In Figure 4 is shown a cross sectional view of the recording devices. The scriber 30 comprises a hollow casing 41 within which is slidably mounted a pointer or scriber member 43 which is forced to the left by means of the spring 42. One of the recesses in the rod 37 is shown as well as one of the plungers 44 on the outer end of which is provided a number representing the particular number of gallons of gasoline which will be measured when that plunger is in alignment with the rod 40. Referring to Fig. 3 it will be noted that the rod 40 passes through a hole in the member 37 into contact with the plunger in the recess adjacent the hole. The plate 46 shown in Fig. 4 and more clearly in Figs. 11 and 7, is provided with an arcuate slot in which the scriber 43 travels in contact with the outer tape indicated as $R^a$. This tape is fed from the spool 33. A tape $R^b$ (see Fig. 2) is fed from the spool 34 and passes down along with tape $R^a$ through a channel formed by the plate 46 and the plate 81 (see Fig. 12) directly in back thereof. In actual operation a tape having a double carbon surface will be provided between the two ribbons $R^a$ and $R^b$ so that the recording devices will make a record on each of the tapes.

Journaled in the frame 31 as shown in Fig. 2 on the same shaft with spool 35 (see Fig. 12) on which the permanent record $R^b$ winds up, is a ratchet wheel 47 which cooperates with the vertically slidable pawl 48 (see Fig. 11). The operation of this ratchet and pawl will be described later.

As more clearly shown in Fig. 3, there is disclosed the pivots 50 and 51 in which are journaled the short pivot rods 52 and 53. It is pointed out that the shafts 52 and 53 extend completely across the casing 32 and are in the same plane but separated from each other as will appear in Figures 5 and 6. These shafts are shown broken in Fig. 3 for sake of clarity but they actually extend completely across the casing and parallel to each other. Mounted on these shafts 52 and 53, are the members 54 and 55 respectively the latter of which has one-half of its surface cut with gear teeth as is shown in Fig. 6. These teeth mesh with the gear 27' which is mounted on and secured to the transversely extending shaft 27. Attached to the members 54 and 55 are the flexible connections 58 and 59 which are respectively connected to the levers 62 and 63. The levers 62 and 63 are pivotally supported on the pivot pins 60 and 61 respectively and which in turn support by means of the pivot pins 75 and 74 respectively, the vertically slidable casing cover 39. As shown in Fig. 3, depending from members 54 and 55 by rods, are the weights 56 and 57 which are threadedly mounted on said rods. These weights tend to maintain the recording maximum in normal position and to return it thereto after a measuring and recording operation.

It will be seen then that the cover member 39 supports the weight of the liquid in the chamber 13, chamber 70, pipe 71 and chamber 24 on the pivot pin 38 and that this weight is transmitted through the levers 62 and 63 to the members 54 and 55 respectively to cause them to rotate against the action of the weights 57 and 56 respectively to thereby cause a displacement of the shaft 27 and its pointers an amount proportionately to the weight of the liquid in the said chambers.

In Figs. 7, 11 and 12 is shown the spool support 31. It comprises the two members 31 in which are rotatably mounted the spools 33, 34 and 35. These brackets support the plate 81 and the plate 46 which are parallel to each other and sufficiently separated so that the tapes $R^a$ and $R^b$ may pass downwardly therebetween as is shown for instance in Figs. 2, 3 and 4. It will be noted that the plate 46 is cut away on the line 46' so that the outer tape $R^a$ may be pulled down after a recording operation and torn off to provide a permanent independent record of the shape shown in Fig. 10. The vertical lines represent a number of gallons which have been dispensed in a single unit and the curved line C. is a record indicating how accurately the given volume for which the device has been set to deliver approaches the proper weight for that quantity. Thus, in the record shown in Fig. 10 a volume of sixty gallons having been dispensed, it is evident that the gasoline sold was somewhat heavier than the standard weight of that quantity of gasoline since the machine is nominally adjusted so that the record produced will exactly terminate on the line representing the particular number of gallons which the machine has been previously set to deliver. The record in Fig. 9 is that made on the tape $R^b$ and represents a continuous record of the total number of gallons dispensed over a period. The vertical movement of this tape $R^b$ is provided by means of the ratchet wheel 47 and the pawl 48 and this movement is represented by the vertical distance between two adjacent curved lines. The record is shown at B. and the line drawn starting from the point zero and moving towards the right represents the quantity dispensed while the return line does not represent anything except that its extreme left hand end does indicate the quantity of liquid left in the device. When this return line however moves completely back to zero, the indication is that the measured gasoline has been completely removed from the machine.

The operation of the machine or dispensing device is as follows: The valve 26 is closed and the chamber 24 is moved the proper distance away from the pivot point 38 by means of handle 36 to adjust the apparatus for the particular quantity of gasoline which it is intended to dispense. This movement of the chamber causes the pipe 71 to slide in or out of chamber 70 and the arm 37 to slide in or out of the bracket 73, depending upon the quantity of gasoline to be dispensed. As shown in Fig. 5 the device is adjusted to dispense the maximum amount of gasoline and the last plunger 44 has been brought into alignment with the rod 40, (see Fig. 3), and is held in proper position by the passage of the rod 40 into the hole directly in line with the plunger 44. For purposes of illustration we will assume that the device is adapted to dispense fifty gallons of gasoline when the rod 40 is in alignment with the last plunger 44. The numeral 50 will be provided in relief on the end of this plunger. The device is now adjusted to measure out fifty gallons of gasoline and the recording apparatus is now at zero. The pump 4 is then operated to deliver gasoline to the chamber 13 through pipe 5. The gasoline runs down through pipe 71 and fills the tank 24, pipe 71, chamber 70 and overflows into tank 13. As tank 13 fills, the weight of the gasoline pressing downwardly tends to rotate the structure about the pivot pin 38 raising the tank 24 upwardly. When fifty gallons of gasoline have been delivered to the chamber 13, the device will have rotated about the pivot pin 38 so that the outer right end of the chamber 70 (see Fig. 7) will have moved downwardly a sufficient amount to permit the weighted arm 17 to rotate about its pivot 21 and operate the valve 9 to shut off the supply of gasoline. During this operation the total weight of gasoline in the chambers will have gradually forced the member 39 downwardly against the action of the weights 56 and 57 to raise the ends of the levers 62 and 63 to which the flexible connections 59 and 58 respectively are connected to cause the rotation of the shaft 27 a sufficient amount, so that the scriber will have made a record on both the tapes R$^a$ and R$^b$. At the completion of the downward movement of the chamber 70 the pawl 48 will cause a slight rotation of the ratchet wheel 47 carrying with it spool 35 causing the tape R$^b$ to be wound up a small amount on the spool 35. The movement caused by the pawl 48 is represented by the vertical distance between two parallel pairs of lines on the permanent record R$^b$. By forcing the rod 40 inwardly the plunger 44 may be caused to stamp the number 50 on both tapes. The measuring operations have now been completed and the gasoline may be delivered from the measuring device through the hose 25 on opening valve 26. It may be noted also that the scales 28' and 85 give visible indications of the amount of gasoline being dispensed. As the tanks empty and the weight therein reduces, the apparatus pivots about the pin 38 and returns to its normal position. The operator of the device pulls the tape R$^b$ down sufficient and tears it off against the cutting edge 46' to give the record shown in Fig. 10. It may be well to point out here again that a double carbon surface tape is provided between the two tapes so that a record will be made on each of them. This has not been shown in the drawings for the sake of clarity.

The principle in back of the operation of this device is that as the gasoline enters the United States standard gallon tank 24, its weight acting on the lever extending to the left of the pivot pin 38, is adapted to balance the weight of the gasoline in chambers 70 and 13 which is re-acting through a shorter lever arm to the right of the pivot pin 38. It will be noted that the center of the pivot pin 38 is to the left of the center of the tank 13 so that the weight of the gasoline in this tank is acting through a shorter lever arm to balance the weight of the quantity of gasoline in the container 24 which is of a standard volume. The adjustment of the device for dispensing different quantities of gasoline is provided by varying the length of the lever arm through which the weight of the gasoline in tank 24 operates.

It is evident that many modifications and changes in the details of construction and arrangement of parts will readily occur to those skilled in the art. It is, of course evident that after the device is constructed it must of necessity be adjusted so that it will properly measure off a predetermined quantity of gasoline and make a correct record thereof. The indicating apparatus may be readily adjusted by means of the weights 56 and 57 and the point of shut off of valve 9 can be controlled by moving the weight on the rod 17.

I do not therefore desire to be limited to the particular construction disclosed by me for purposes of illustration but rather to the spirit and scope of my invention as it is defined in the appended claims.

What I seek to secure by United States Letters Patent is:

1. In a liquid measuring device the combination with a source of liquid supply and means for delivering liquid from said source of a means for receiving the liquid, said means being mounted to move about a fixed point under the influence of the weight of the liquid received in said means and means actuated by the movement of said receiving means for making a record of the weight of liquid received by said means.

2. The combination with a pivotal support and a balanced liquid receiving chamber on said support of means for making a permanent record of the weight of the liquid received in said chamber by movement of said receiving chamber about said support under the weight of the received liquid.

3. The combination with a chamber mounted for pivotal movement about a point, of means for delivering a liquid to said chamber, means for removing the liquid from said chamber and means for making a continuous record of the weight of the liquid passing through said chamber, said recording means being operated by the weight of the liquid in said chamber.

4. In a liquid weighing machine the combination with a movable balanced chamber of means actuated by movement of the chamber for cutting off the source of supply when a predetermined quantity has been received in said chamber, and means for recording the weight of said quantity, said recording means being operated by the movement of said chamber under the weight of received liquid.

5. In a liquid dispensing and weighing machine the combination with a chamber of standard volume and a second chamber, said chambers being supported on a beam on opposite sides of a pivot and connected together by a conduit of means for making a permanent record of a predetermined quantity of liquid to be dispensed, said recording means being operated by the weight of the liquid in said chamber.

6. In a liquid dispensing and weighing machine the combination with a chamber of standard volume and a second chamber, said chambers being supported on a beam on opposite sides of a pivot and connected together by a conduit of means for weighing a predetermined quantity of said liquid and means for delivering said liquid from the device.

7. In a liquid dispensing and weighing machine the combination with a chamber of standard volume and a second chamber, said chambers being supported on a beam on opposite sides of a pivot and connected together by a conduit of means for delivering liquid to said connected chambers and means operated by the movement of said connected chambers about the pivot point for shutting off the supply of liquid when a predetermined quantity of liquid has been delivered to said chambers.

8. In a weighing and dispensing device the combination with a chamber of standard volume, a casing supported on a pivot point, a beam connecting said chamber and casing, a conduit for providing a passage between said chamber and casing and a second chamber joined to said casing by a flexible connection, said standard chamber being movable with respect to said casing and pivot point to set the device to measure a predetermined quantity of liquid in amount depending upon the distance of said chamber from said pivot point of means for weighing the quantity of liquid in said chambers and casing.

9. In a weighing and dispensing device the combination with a chamber of standard volume, a casing supported on a pivot point, a beam connecting said chamber and casing, a conduit for providing a passage between said chamber and casing and a second chamber joined to said casing by a flexible connection, said standard chamber being movable with respect to said casing and pivot point to set the device to measure a predetermined quantity of liquid in amount depending upon the distance of said chamber from said pivot point of means for weighing the quantity of liquid in said chambers and casing and means for making a permanent record of the weight of said quantity of liquid.

10. In a weighing and dispensing device the combination with a chamber of standard volume, a casing supported on a pivot point, a beam connecting said chamber and casing, a conduit for providing a passage between said chamber and casing and a second chamber joined to said casing by a flexible connection, said standard chamber being movable with respect to said casing and pivot point to set the device to measure a predetermined quantity of liquid in amount depending upon the distance of said chamber from said pivot point of means for weighing the quantity of liquid in said chambers and casing, means for making a printed record of the number of gallons of liquid in said chambers and casing and means for making a record of the weight of said liquid.

11. In a weighing and dispensing device the combination with a chamber of standard volume, a casing supported on a pivot point, a beam connecting said chamber and casing, a conduit for providing a passage between said chamber and casing and a second chamber joined to said casing by a flexible connection, said standard chamber being movable with respect to said casing and pivot point to set the device to measure a predetermined quantity of liquid in amount depending upon the distance of said chamber from said pivot point of means for weighing the quantity of liquid in said chambers and casing, means for making a printed record of the number of gallons of liquid in said chambers and casing, means for making a record of the weight of said liquid, means for supplying liquid to said device and means for cutting off the supply of liquid when a predetermined quantity has been delivered to said chambers and casing.

12. In a device of the type described the combination with means for receiving a predetermined quantity of liquid and means for supplying liquid to said means of means for cutting off the delivery of liquid from said supply means when a predetermined quantity of liquid has been delivered to said receiving means and a weight actuated means for making a permanent record of the quantity of liquid received in said receiving means.

13. The combination with a support, a chamber therein having a flexible bottom and means of supplying liquid to said chamber of a chamber of standard volume received at the end of a lever, a pivoted support for said lever, conduit means for connecting said chamber of standard volume with said chamber on said support, a casing connecting both said conduit and said flexible bottom, said lever and conduit having sliding connections with said casing so that said chamber of standard volume may be moved with respect to said pivoted support and means operated by the movement of said lever and casing about pivotal support for cutting off said supply means after the delivery of a predetermined quantity of liquid.

14. In a measuring device the combination with a chamber, a pivotal support for said chamber and means for supplying liquid to said chamber of means operated by the weight of liquid in the chamber acting on said pivotal support for making a record of the weight of the liquid in said chamber.

15. In a measuring device the combination with a chamber, a pivotal support for said chamber and means for supplying liquid to said chamber of means operated by the weight of liquid in the chamber acting on said pivotal support for making a record of the weight of the liquid in said chamber and means operated by the movement of said chamber for readjusting said record making means after each weighing operation.

16. In a liquid dispensing device the combination with a casing, a shaft journaled therein, a closure for said casing supported on balanced levers and means operated through said levers upon the depression of said closure for operating said shaft of a chamber supported on said closure and means operated by said shaft for recording the weight of the liquid received in said chamber.

17. In a liquid dispensing device the combination with a casing, a shaft journaled therein, a closure for said casing supported on balanced levers and means operated through said levers upon the depression of said closure for operating said shaft of a chamber mounted on a pivot on said closure, a standard volume chamber connected to said first chamber and means operated by the movement of said chambers about the pivot for cutting off the supply of liquid to said chambers.

18. In a liquid dispensing device the combination with a casing, a shaft journaled therein, a closure for said casing supported on balanced levers and means operated through said levers upon the depression of said closure for operating said shaft of two chambers of different volume supported by the pivot at a point therebetween, means for supplying liquid to said chambers, means for cutting off the liquid supply and means operated by said shaft through the influence of the weight of liquid in said chambers for making a record of weight of the liquid in said chambers.

19. The combination with a source of liquid supply and means for delivering liquid from said source of pivoted means for receiving said liquid, a conduit conducting liquid from said source to said receiving means having a valve therein, means operated by the movement of said chamber about said pivot for operating said valve to cut off the liquid supply when a predetermined quantity of liquid has been delivered to said chamber and means also operated by the movement of said chamber for making a record of the weight of liquid in said chamber.

20. In a liquid weighing and dispensing device, the combination with a receptacle having a flexible bottom, a chamber connected to said receptacle through its flexible bottom, a pivotal support for said chamber, a supply conduit having a valve therein and means operated by the movement of said chamber about said pivotal support for operating said valve to cut off the liquid supply when a predetermined quantity of liquid has been delivered to said receptacle and chamber.

In testimony whereof I have hereunto set my hand on this 24th day of March A. D., 1927.

JAMES K. DARBY.